Figure 1:
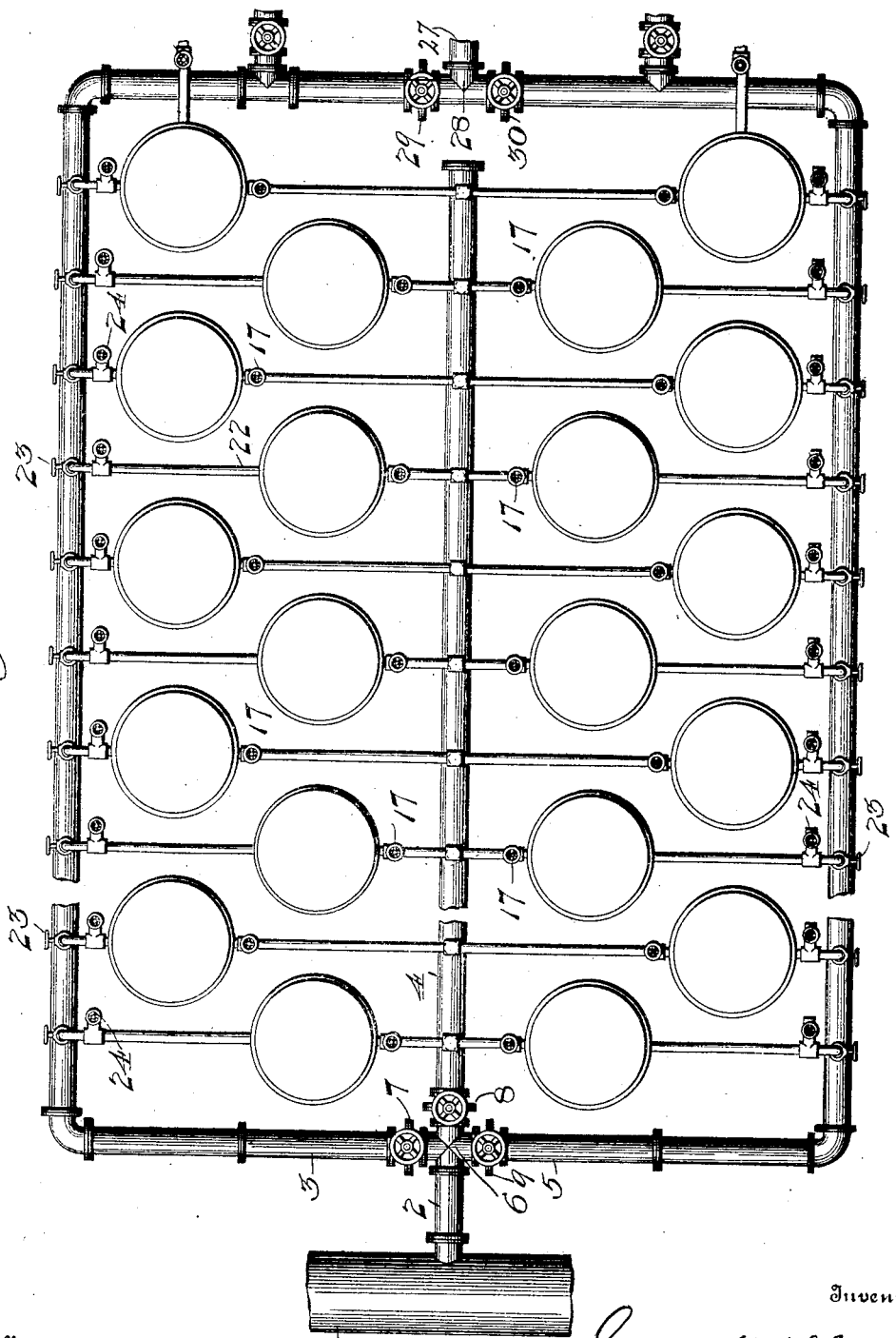

No. 805,374. PATENTED NOV. 21, 1905.
J. H. McDONALD.
APPARATUS FOR PURIFYING WATER.
APPLICATION FILED DEC. 21, 1900.

2 SHEETS—SHEET 1.

Witnesses
Inventor:
Joseph H. McDonald,
By Joseph F. Atkins,
Attorney.

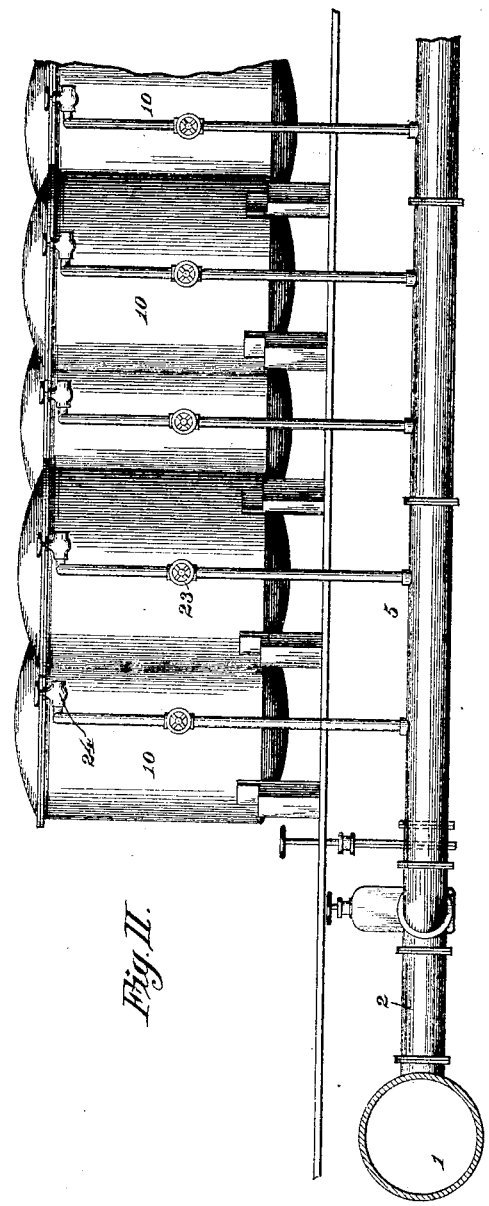
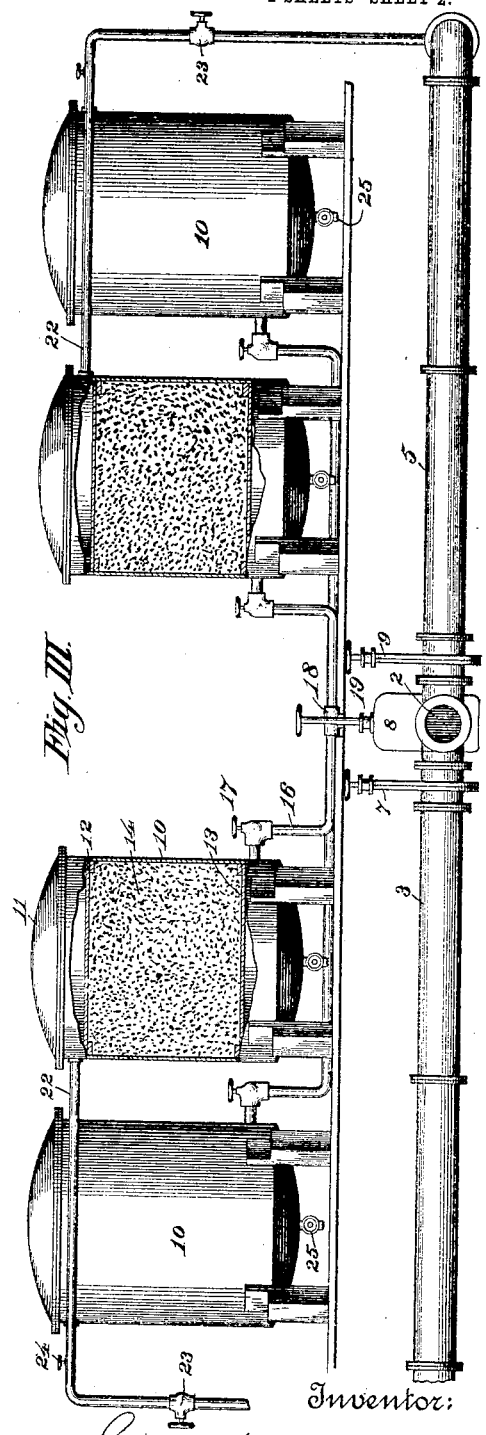

UNITED STATES PATENT OFFICE.

JOSEPH H. McDONALD, OF NEW YORK, N. Y.

APPARATUS FOR PURIFYING WATER.

No. 805,374.     Specification of Letters Patent.     Patented Nov. 21, 1905.

Application filed December 21, 1900. Serial No. 40,683.

*To all whom it may concern:*

Be it known that I, JOSEPH H. MCDONALD, of New York, in the county of New York, State of New York, have invented certain new and useful Improvements in Apparatus for Purifying Water, of which the following is a complete specification, reference being had to the accompanying drawings.

The object of my invention is to produce apparatus for thoroughly purifying the water-supply of a city, and comprehends means whereby the state of purification up to the last stage of absolute purity obtainable by filtration may be regulated to suit the requirements of use. Special provision is made in my apparatus not only for varying the means and degree of filtration, but also for cleansing parts of the apparatus as required without interruption of the flow of filtered-water supply.

It is recognized by scientists to be a fact that the presence of microscopic life in water constitutes the source of greatest menace to health in drinking-water. Filters in general use, especially such as are adapted to afford considerable delivery of purified water, while adapted at their best to reduce water to a practically pure state from a sanitary standpoint, become, nevertheless, after a short period of operation fouled. This condition is due to the fact, well recognized in the art, that filtering media become by use inevitably charged with an offensive slime, which becomes sponge-like and sufficiently porous for the passage through it of the water, but which robs the media of their efficiency as agencies of filtration. Moreover, the presence thereof constitutes in itself an additional source of contamination to water passing through it. This mass of slime and other offensive matter cannot be washed out of the filtering material by water or air because, being permeable to water in the process of filtration, the washing-water or air employed finds likewise ready passage through it. For that reason I employ in my system of water purification means for subjecting the filtering material to such a degree of heat as will coagulate and disintegrate the slime and other deleterious material in the filtering media, after which it may be readily cleaned by washing. Consequently by that means I am enabled at regular intervals of any required duration to restore the filtering media of my system absolutely to its initial efficiency, and thereby to obtain a constant supply of practically pure water.

What constitutes my invention will be hereinafter specified in detail, and succinctly set forth in the appended claims.

In the accompanying drawings I illustrate one form of embodiment of my invention which will afford a means of explication of its principle.

In the drawings, Figure I is a top plan view of my system complete, portions being broken away in order to permit of illustration upon a scale sufficiently large to be readily legible. Fig. II is a side elevation of a portion of the filter-battery. Fig. III is an end elevation of the filter-battery shown in Fig. I.

Referring to the numerals on the drawings, 1 indicates a main supply-pipe communicating with a source of water-supply—for example, a reservoir (not illustrated) adapted to afford a suitable head of water. 2 indicates a main leading therefrom and preferably communicating with branches 3, 4, and 5, through a four-way fitting 6, the head of each branch being controlled by a valve, (indicated by 7, 8, and 9, respectively.) The number of branches is non-essential except in so far as they shall afford independent means of water-supply through or around a battery or batteries of filters. By "battery of filters" I mean a plurality of individual filters which may be operated as a unit. In the accompanying drawings I illustrate what may be regarded as a single battery of filters or two batteries of filters located upon opposite sides of the branch pipe 4. They constitute a single battery, because collectively they may be operated as a unit, while at the same time they constitute two batteries, because one set of filters on one side of the branch 4 may be in operation while the other set is being cleaned. In this connection it may be also specified that any one of the filters comprehended in the battery or batteries may be shut out of service individually or in connection with any other or others without interruption of the operation of the remaining filters.

Inasmuch as each filter is essentially identical with every other one, it will be sufficient to describe one for all. Referring, therefore, to Fig. III, it is specified that each filter consists of a closed case 10, constructed so as to withstand any pressure that may be put upon them and having a cap 11 secured to the case, as by a crown of bolts or otherwise, which will facilitate the gaining of access to the interior of the case 10. Each case is divided by transverse or horizontal partitions 12 and 13, adapted to confine between them a mass of filtering material 14. This material may be of any preferred kind—such, for example, as granulated coke. I do not limit myself to the employment of any special filtering medium in preference to another. Each case 10 is provided with an inlet-pipe 16, having a controlling-valve 17. For convenience of construction each pair of pipes 16 communicates with a T-fitting 18, through which communication is established, as through a common supply-pipe 19, with the main branch 4. As illustrated, each pipe 16 is a supply-pipe and communicates, preferably, with the interior of its case 10 below the partition 13. With that arrangement a discharge-pipe 22 leads from the interior of the case 10 above its partition 12. Consequently water in passing from the supply-pipe 16 to its correlated discharge-pipe 22 must pass through the mass of filtering material 14. Each discharge-pipe 22 is provided with a controlling-valve 23, and each of the pipes 22 between the valve 23 and its case 10 is provided with a valve-controlled steam-pipe 24, communicating with a source of steam-supply. (Not illustrated.) Each case is also provided, preferably in its bottom, with a valve-controlled wash-out pipe 25. It may be for convenience here specified that by closing the valves 17 and 23 of any of the cases 10 and by opening the pipes 24 and 25 the filtering material 14 of that case may be thoroughly sterilized by heat of the steam from its pipe 24, after which the pipe 24 may be closed, and the valve 17 being opened the steam-treated impurities may be washed out from the mass of filtering material and discharged through the pipe 25. It is in this manner that the filtering material may be sterilized and restored to its initial efficiency whenever required. The branch pipes 3 and 5 after passing around the battery or batteries of filters with which they are respectively connected through their individual discharge-pipes 22 preferably meet in a general delivery-pipe 27, connection being preferably made therewith, as through a T-fitting 28, upon the opposite sides of which the pipes 3 and 5 are, by preference, provided, respectively, with valves 29 and 30.

The foregoing apparatus constitutes one complete form of embodiment of my invention, being adapted to afford, through the delivery-pipe 27, a constant flow of water rendered as pure as filtration can make it. It will therefore be in order to specify at this point the operation of so much of the apparatus as is above described, with the exception of so much of the mode of operation as has been already explained. Proceeding accordingly, it may be stated that ordinarily when the apparatus is in operation as a whole the valves 7 and 9 are closed and the valves 8, 30, and 29 are kept open. The end of the pipe 4 being closed, water from the main 1 passing into the branch 4 is thence distributed through the various filters, each of which through its respective pipe 22 discharges into its respective branch pipe 3 or 5, whence it issues to the delivery-pipe 27 and is by it conducted to the different points of service along its line. I, however, provide the medial branch pipe 4 in order that the filters arranged upon opposite sides thereof may be constituted into independent batteries for alternate operation, whereby one battery may be cleaned while the other is in operation, and vice versa. It may be readily apprehended that this is entirely feasible, because the capacity of each battery may be increased without limit. In operating the system upon the plan last mentioned either of the lateral batteries by which for convenience the filters upon opposite sides of the branch 4 may be designated may be shut out of operation by closing either the valve 29 or the valve 30 and by closing all of the valves 17 when the battery is ready to be sterilized in the manner above specified. After the sterilizing treatment the washing of the filtering material in the several cases 10 may be accomplished either by the use of water admitted through the respective pipes 16 or by opening the valve 9 through the pipe 5. Indeed by alternating the flow backward and forward through the filtering material after it is sterilized the most complete cleansing of each filter is made practicable. It is also obvious that after the sterilizing and washing operation a final purification or drying of the interior of the filters and their respective pipe connections may be made by blowing steam through them.

If the intermediary branch pipe 4 be by manipulation of the valve 8 cut out of service, provision is made for conversion of the pipe 3 or pipe 5 into a supply-pipe or a discharge-pipe at will, depending upon the manipulation of the valves 7 and 9, the opening of the valve 7 and the closing of the valve 9 rendering the pipe 3, the supply-pipe, and the pipe 5 the discharge-pipe, and vice versa. In the present-described mode of operation of my apparatus the outlet-valve of the supply-pipe 29 or 30, as the case may be, is closed, that of the discharge-pipe for the time being remaining open. The result effected is double filtration for the entire water supply that is conveyed to the delivery-pipe 27.

In addition to means for providing for the sterilizing and cleansing of the filters my system provides means for supplying to the delivery-pipe 27 from a single point of operation a volume of water direct from the main 1. This would be an obvious advantage in case of the occurrence of a great conflagration along the line of the pipe 27 when the greatest possible supply of water regardless of its state of purity would be needed. For this purpose all that would be necessary to do would be to close the valve 8 and open the valves 7 and 9, the valves 29 and 30 being, as in ordinary operation, open.

What I claim is—

1. In a water-purifying apparatus the combination with a main and a plurality of pipes and means for converting any one of said pipes into a supply-pipe and another into a discharge-pipe, of a battery of filters operatively communicating as such therewith respectively.

2. In a water-purifying apparatus the combination with a main and a plurality of pipes and means for converting any one of said pipes into a supply-pipe and another into a discharge-pipe, of a battery of filters operatively communicating as such therewith respectively, and means for shutting the battery as a unit out of service without interrupting the flow from the main.

3. In a water-purifying apparatus the combination with a main, an intermediary branch pipe, and branch pipes upon opposite sides of said intermediary branch pipe, valves controlling said several branches respectively, two batteries of filters operatively communicating with said branches and intermediary respectively, and a delivery-pipe.

4. In a water-purifying apparatus the combination with a main, an intermediary branch pipe, and branch pipes upon opposite sides of said intermediary branch pipe, valves controlling said several branches respectively, two batteries of filters operatively communicating with said branches and intermediary respectively, and means for operating said batteries separately or as a unit.

5. In a water-purifying apparatus the combination with a main and a plurality of not less than three branch pipes, of a battery of filters operatively communicating with the branch pipes respectively, and means, including a wash-out pipe in each filter of said battery, for constituting any branch pipe into a supply-pipe and another into a discharge-pipe at will.

6. In a water-purifying apparatus, the combination with a main and a plurality of pipes and means for converting any one of said pipes into a supply-pipe and another into a discharge-pipe, of a battery of filters and means for throwing the battery as a unit into operative communication with said pipes alternatively as set forth.

7. In a water-purifying apparatus the combination with a main and a plurality of pipes and means for converting any one of said pipes into a supply-pipe and another into a discharge-pipe, of a battery of filters and means for throwing the battery as a unit into operative communication with said pipes alternatively as set forth, and means for dividing said unitary battery of filters into a plurality of batteries of filters.

8. In a water-purifying apparatus the combination with a main, an intermediary branch pipe, and branch pipes upon opposite sides of said intermediary branch pipe, valves controlling said several branches respectively, two batteries of filters operatively communicating with said branches and intermediary respectively and means for operating said batteries through communication of the intermediary with the main or independently of such communication.

9. In a water-purifying apparatus, the combination with a main, a plurality of branch pipes and valves controlling said several branches respectively, of a plurality of batteries of filters in operative communication with the branch pipes and means for operating said batteries independently or successively for the purpose of single or double filtration.

10. In a water-purifying apparatus the combination with a main, an intermediary branch pipe, and branch pipes upon opposite sides of said intermediary pipe, valves controlling said several branches respectively, two batteries of filters operatively communicating with said branches and intermediary, respectively, and means for operating the members of said batteries singly from the intermediary branch or successively for double filtration between the lateral branches.

11. In a water-purifying apparatus, the combination with a main and a plurality of branches, of a battery of filters in operative communication with said branches, a delivery-pipe and means for supplying to the delivery-pipe from a single point of operation a volume of water direct from the main and around the filters.

In testimony of all which I have hereunto subscribed my name.

JOSEPH H. McDONALD.

Witnesses:
ALFRED A. TALLMAN, Jr.,
JOHN G. FOLSOM.